United States Patent
Tobaru et al.

(10) Patent No.: US 6,611,784 B2
(45) Date of Patent: Aug. 26, 2003

(54) PROCESS FOR DETERMINING LATERAL OVERTURNING OF VEHICLE

(75) Inventors: Shigeo Tobaru, Wako (JP); Hiroyuki Maeda, Wako (JP); Osamu Takahata, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 313 days.

(21) Appl. No.: 09/809,747

(22) Filed: Mar. 15, 2001

(65) Prior Publication Data

US 2001/0029438 A1 Oct. 11, 2001

(30) Foreign Application Priority Data

Mar. 17, 2000 (JP) .......................... 2000-077153
Mar. 17, 2000 (JP) .......................... 2000-077199
Mar. 17, 2000 (JP) .......................... 2000-077278

(51) Int. Cl.$^7$ .......................... G01C 17/00; G01C 19/00
(52) U.S. Cl. .......................... 702/151; 701/1
(58) Field of Search .......................... 702/150, 151; 701/1, 82, 45, 70; 340/429, 440

(56) References Cited

U.S. PATENT DOCUMENTS

| | | | | | |
|---|---|---|---|---|---|
| 5,797,111 | A | * | 8/1998 | Halasz et al. | 701/103 |
| 6,055,472 | A | * | 4/2000 | Breunig et al. | 701/45 |
| 6,104,284 | A | * | 8/2000 | Otsuka | 340/440 |
| 6,185,489 | B1 | * | 2/2001 | Strickler | 701/29 |
| 6,212,455 | B1 | * | 4/2001 | Weaver | 701/45 |
| 6,262,658 | B1 | * | 7/2001 | O'Connor | 340/440 |
| 6,332,104 | B1 | * | 12/2001 | Brown et al. | 701/1 |
| 6,438,463 | B1 | * | 8/2002 | Tobaru et al. | 701/1 |
| 2002/0173882 | A1 | * | 11/2002 | Tobaru et al. | 701/1 |

FOREIGN PATENT DOCUMENTS

JP         7164985         6/1995

* cited by examiner

Primary Examiner—John Barlow
Assistant Examiner—Demetrius Pretlow
(74) Attorney, Agent, or Firm—Carrier, Blackman, & Associates, P.C.; Joseph P. Carrier; William D. Blackman

(57) ABSTRACT

A process for determining lateral overturning of a vehicle in which a threshold value line is established separating a lateral overturning region farther from an origin and a lateral non-overturning region closer to the origin on a two-dimensional map made using a rolling angle $\theta$ and a rolling angular speed $\omega$ of the vehicle as parameters. When a hysteresis line for actual rolling angles and actual rolling angular speeds of the vehicle traverses the threshold value line from the lateral non-overturning region to the lateral overturning region, it is determined that there is a possibility of lateral overturning of the vehicle. When the rolling angular speed $\omega$ of the vehicle is increased sharply after the rolling angle $\theta$ has reached a fully bumping rolling angle $\theta FB$ while the rolling angular speed $\omega$ was decreased, it is determined that the vehicle is in a state in which the lateral overturning due to a rolling resonance phenomenon is liable to occur, whereby the threshold value line S is moved toward the origin.

16 Claims, 16 Drawing Sheets

| NAME | IMAGE | CLASSIFICATION |
|---|---|---|
| FLIP OVER | | SIMPLE ROLL |
| CLIMB OVER | | SIMPLE ROLL |
| FALL OVER | | SIMPLE ROLL |
| TRIP OVER | | SIMPLE ROLL + SIDESLIP SPEED |
| TURN OVER | | DIVERGENCE |

FIG.1
| NAME | IMAGE | CLASSIFICATION |
|---|---|---|
| FLIP OVER | 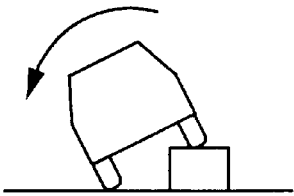 | SIMPLE ROLL |
| CLIMB OVER | 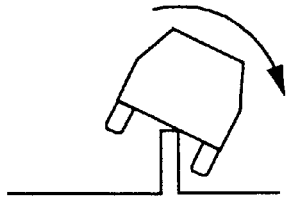 | SIMPLE ROLL |
| FALL OVER | 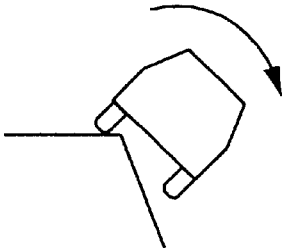 | SIMPLE ROLL |
| TRIP OVER | 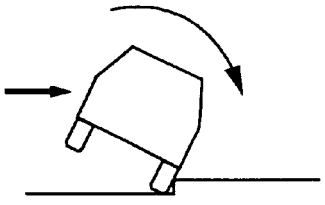 | SIMPLE ROLL + SIDESLIP SPEED |
| TURN OVER | 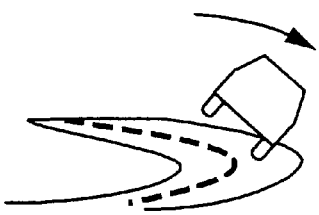 | DIVERGENCE |

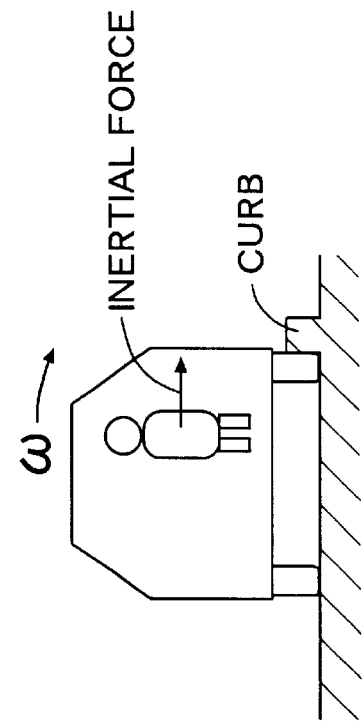
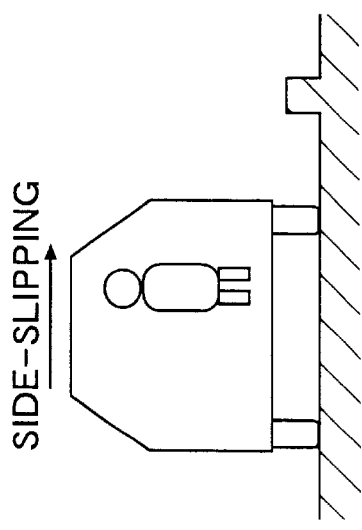
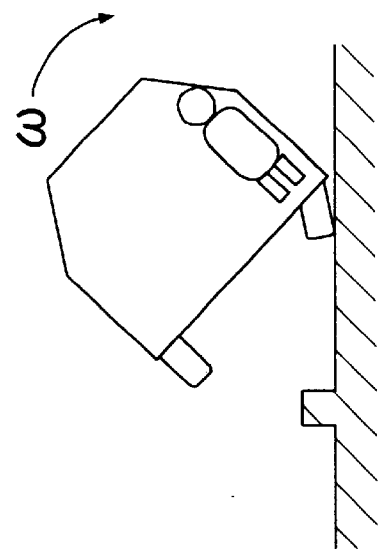
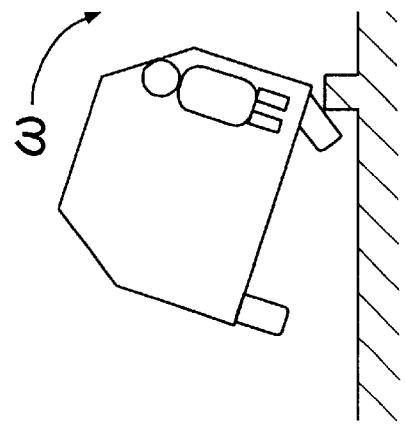

PROCESS FOR DETERMINING LATERAL OVERTURNING OF VEHICLE

BACKGROUND OF THE INVENTION

1. Field of the Invention

The present invention relates to a process for determining the presence or absence of a possibility that a vehicle is overturned laterally or sideways, based on a rolling angle and a rolling angular speed of the vehicle.

2. Description of the Related Art

On a two-dimensional map made using a rolling angle and a rolling angular speed of a vehicle used as parameters, a lateral overturning region is established in an area where the rolling angle and the rolling angular speed are larger (i.e., an area farther from an origin), and a lateral non-overturning region is established in an area where the rolling angle and the rolling angular speed are smaller (i.e., an area including the origin). A process for determining the possibility of the lateral overturning of a vehicle is known from Japanese Patent Application Laid-open No. 7-164985. According to the known process, when a hysteresis line made by plotting actual rolling angles and actual rolling angular speeds on the map has entered into the lateral overturning region from the lateral non-overturning region, it is determined that there is a possibility that the vehicle is overturned laterally or sideways, and an active roll bar is raised.

When a vehicle is rolled largely leftwards to reach a fully bumping rolling angle, for example, because a steering wheel has suddenly been operated leftwards in a course of a driving operation such as a double-lane changing operation, a suspension spring for a left wheel may be contracted to a limit, and a suspension spring for a right wheel may be expanded to a limit. When the left and right suspension springs are contracted and expanded to the limits in the above manner, a buffering effect for a rolling moment provided by the resilience of the suspension springs is lost. For this reason, there is a possibility that the leftward rolling angular speed is increased sharply, and as a result, the vehicle laterally overturns. Such lateral overturning due to a rolling resonance phenomenon occurs suddenly. Therefore, in the determination using a lateral overturning region and a lateral non-overturning region established on a usual two-dimensional map, there is a possibility that a delay is produced and thus, an occupant restraint device such as an air curtain cannot be operated with a proper timing.

When a tire has collided against a curb or the like in a course of side slipping of the vehicle, the rolling angular speed may be increased sharply by a rolling moment about the tire and as a result, the vehicle may be overturned laterally or sideways in a short time. In the lateral overturning of a type called "trip-over", an occupant on a seat is moved to an outer side of a vehicle body (toward a door) by inertia at a time point when the tire has collided against the curb or the like, resulting in a reduced sideslip speed. For this reason, the smooth deployment of an air curtain to be deployed along an inner surface of a door or an air bag to be deployed upon side-collision of the vehicle may be obstructed in some cases. Therefore, when the tire has collided against the curb or the like, it is necessary to early presume the occurrence of the lateral overturning of the "trip-over" type to operate the occupant restraint device quickly.

The above known process suffers from a problem that as long as the hysteresis line for the rolling angle and the rolling angular speed indicating the operational state of the vehicle exists in the lateral non-overturning region on the two-dimensional map, even if intended driving causing the hysteresis line to be extremely close to the lateral overturning region is repeatedly conducted, a driver does not notice this fact and does not moderate his/her driving. In addition, when a lateral overturning accident of the vehicle has occurred, it is extremely difficult to verify later how the rolling angle and the rolling angular speed are varied, and which resulted in the lateral overturning of the vehicle.

SUMMARY OF THE INVENTION

Accordingly, it is a first object of the present invention to ensure that in the determination of the presence or absence of a possibility of lateral overturning of a vehicle based on a rolling angle and a rolling angular speed of the vehicle, the lateral overturning due to a rolling resonance phenomenon can be coped with.

It is a second object of the present invention to ensure that in the determination of the presence or absence of a possibility of lateral overturning of a vehicle based on a rolling angle and a rolling angular speed of the vehicle, the lateral overturning of the "trip-over" type occurring upon collision of a tire against a curb or the like can be detected earlier.

It is a third object of the present invention to ensure that in the determination of the presence or absence of a possibility of lateral overturning of a vehicle based on a rolling angle and a rolling angular speed of the vehicle, the hysteresis line for the rolling angle and the rolling angular speed can be confirmed later.

To achieve the above first object, according to a first aspect and feature of the present invention, there is provided a process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses the threshold value line from the lateral non-overturning region to the lateral overturning region, it is determined that there is a possibility of lateral overturning of the vehicle, and wherein when the rolling angular speed is increased after the rolling angle has reached a fully-bumping rolling angle while the rolling angular speed was decreased, the threshold value line is moved toward the origin.

With the above feature, when the rolling angular speed is increased after the rolling angle has reached the fully-bumping rolling angle while the rolling angular speed of the vehicle was decreased, it is determined that the vehicle is in a state in which the lateral overturning due to a rolling resonance phenomenon is liable to occur, whereby the threshold value line is moved toward the origin. Therefore, it is possible to ensure that the hysteresis line for the rolling angle and the rolling angular speed easily traverses the threshold value line from the lateral non-overturning region to the lateral overturning region, whereby the determination of the presence of the lateral overturning can be conducted earlier.

To achieve the above second object, according to a second aspect and feature of the present invention, there is provided a process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses the threshold value line from the lateral non-overturning region to the lateral overturning region, it is determined that there is a possibility of lateral overturning of the vehicle, and wherein the threshold value line is moved in accordance with a differentiation value of the rolling angular speed with regard to the rolling angle.

With the above feature, when the vehicle side-slips, causing a tire to collide against a curb or the like on a road, thus suddenly reaching the condition of lateral overturning, a feature of the differentiation value of the rolling angular speed with regard to the rolling angle being increased appears on the two-dimensional map made using the rolling angle and the rolling angular speed as the parameters. With this point in view, it is possible to properly conduct the determination that there is a possibility of a lateral over-turning of a "trip-over" type by moving the threshold value line in accordance with the differentiation value.

To achieve the second object, according to a third aspect and feature of the present invention, there is provided a process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses the threshold value line from the lateral non-overturning region to the lateral overturning region, it is determined that there is a possibility of lateral overturning of the vehicle, and wherein the threshold value line is moved in accordance with a time-differentiation value of the rolling angular speed.

With the above feature, when the vehicle side-slips, causing a tire to collide against a curb or the like on a road, thus suddenly reaching the condition of lateral overturning, a feature of the differentiation value of the rolling angular speed with regard to the rolling angle being increased appears on the two-dimensional map made using the rolling angle and the rolling angular speed as the parameters. With this point in view, it is possible to properly conduct the determination that there is a possibility of a lateral over-turning of a "trip-over" type by moving the threshold value line in accordance with the differentiation value.

To achieve the third object, according to a fourth aspect and feature of the present invention, there is provided a process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses the threshold value line from the lateral non-overturning region to the lateral overturning region, it is determined that there is a possibility of lateral overturning of the vehicle, wherein a data-storing region adjacent the threshold value line is established in the lateral non-overturning region, and when the hysteresis line has entered into the data-storing region, this hysteresis line is stored.

With the above feature, when the hysteresis line for the rolling angle and the rolling angular speed of the vehicle has entered into the data-storing region established adjacent the side of the threshold value line nearer to the origin, such hysteresis line, or the portion thereof in the data-storing region, is stored. Therefore, the stored hysteresis line can be read later to confirm whether the driver's driving operation is/was proper. In addition, even when the vehicle has been overturned laterally, the hysteresis line within the data-storing region is stored and hence, it is possible to easily verify later how the vehicle reached the condition of lateral overturning.

The above and other objects, features and advantages of the invention will become apparent from the following description of the preferred embodiments taken in conjunction with the accompanying drawings.

BRIEF DESCRIPTION OF THE DRAWINGS

FIGS. 1 to 9 show a first embodiment of the present invention, wherein

FIG. 1 is a diagram showing types of lateral overturning of a vehicle;

FIG. 2 is a diagram for explaining the relationship between the rolling angle θ and the rolling angular speed ω of the vehicle, as well as a possibility of lateral overturning of the vehicle;

FIG. 3 is a map for determining whether there is a possibility that the vehicle is overturned laterally or sideways;

FIG. 4 is a block diagram of a control system for an air curtain;

FIG. 5 is a diagram for explaining a technique for calculating an initial value θi of a rolling angle θ from a lateral acceleration Gy;

FIG. 6 is a diagram showing a technique for determining whether a hysteresis line is in a lateral overturning region or in a lateral non-overturning region;

FIG. 7 is a flow chart for explaining the operation of the process according to the first embodiment;

FIG. 8 is a diagram showing the vehicle in a fully bumped state;

FIG. 9 is a diagram showing the movement of a threshold value line upon generation of a rolling resonance;

FIGS. 10 to 12 show a second embodiment of the present invention, wherein FIG. 10 is a block diagram of a control system for an air curtain;

FIGS. 11A to 11D are diagrams for explaining a course of lateral overturning of a "trip-over" type;

FIG. 12 is a diagram showing a hysteresis line for the lateral overturning of a "trip-over" type;

FIGS. 13 to 16 show a third embodiment of the present invention, wherein FIG. 13 is a diagram for explaining the relationship between the rolling angle θ and the rolling angular speed ω, as well as a possibility of lateral overturning of the vehicle;

FIG. 14 is a map for determining whether there is a possibility of lateral overturning of the vehicle;

FIG. 15 is a block diagram of a control system for an air curtain; and

FIG. 16 is a diagram showing a technique for determining whether a hysteresis line is in a lateral overturning region or in a laterally non-overturning region.

DETAILED DESCRIPTION OF THE PREFERRED EMBODIMENTS

A first embodiment of the present invention will now be described with reference to FIGS. 1 to 9.

FIG. 1 shows types of lateral overturning of a vehicle, which are classified by causes. The types of lateral overturning of the vehicle are classified into "simple roll", "simple roll+lateral slipping speed" and "divergence" depending on the behavior of the vehicle in the course of leading to the lateral overturning. The lateral overturning of the "simple roll" type further sub-classified into "flip-over", "climb-over" and "fall-over". The lateral overturning of the "simple roll+lateral slipping speed" type is typically called "trip-over, and the lateral overturning of the "divergence" is typically called "turn-over".

The "flip-over" is a lateral overturning" resulting from climbing of one of left and right wheels of the vehicle onto an obstacle. The "climb-over" is a lateral overturning resulting from the vehicle with its bottom climbing on an obstacle being overturned laterally or sideways with its tire floated up from a road surface. The "fall-over" is a lateral overturning resulting from one of left and right wheels of the vehicle being stepped over the edge of a road and dropped therefrom. The "trip-over" is a lateral overturning caused by a rolling moment produced about a curb or the like when one of left and right tires collides against the curb or the like as a result of lateral slipping of the vehicle. The "turn-over" is a lateral overturning resulting from the diverging of the rolling angle of the vehicle due to a resonance, when a driver makes an attempt to operate a steering wheel alternately leftwards and rightwards in order to make a double-lane change or a triple-lane change or to pass an S-shaped road, if a frequency of such operation of the steering wheel is close to a frequency of natural vibration of a suspension of the vehicle.

Figure 2:
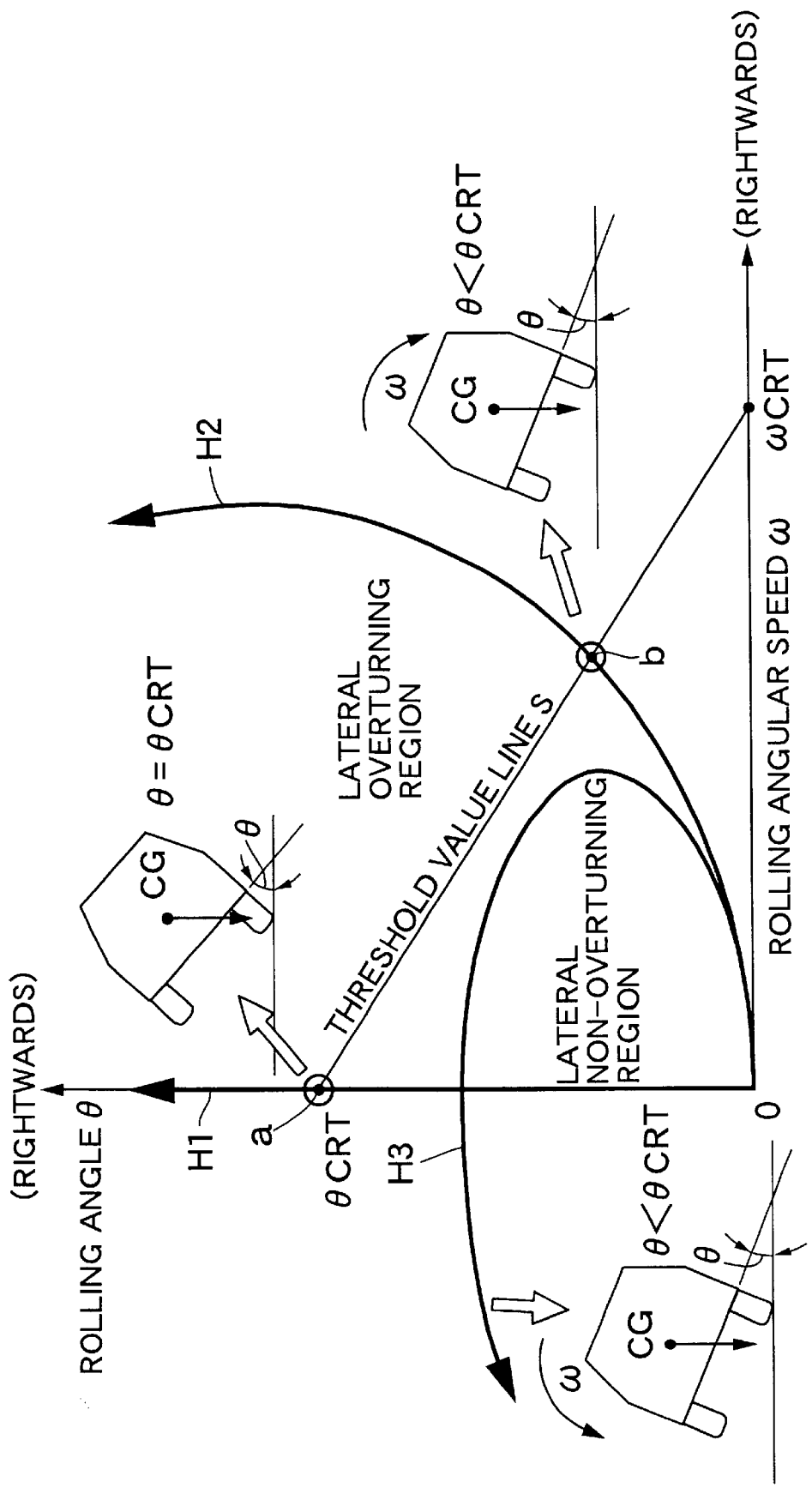

FIG. 2 shows a portion (a first quadrant) of a two-dimensional map for determining a possibility of lateral overturning of the vehicle, wherein the positive value (above the origin) of the rolling angle θ on the axis of ordinates corresponds to the rightward rolling angle, and the positive value (on the right side of the origin) of the rolling angular speed ω on axis of abscissas corresponds to the rightward rolling angular speed. A threshold value line S comprising a rightward declined straight line is established in the two-dimensional map. In this map, a region on the side of the threshold value line S nearer to the origin, namely, a region where the rolling angle θ and the rolling angular speed ω are smaller, is a lateral non-overturning region, and a region on the side of the threshold value line S farther from the origin, namely, a region where the rolling angle and the rolling angular speed ω are larger, is a lateral overturning region. If hysteresis lines H1, H2 and H3 for the actual rolling angle θ and the actual rolling angular speed ω of the vehicle traverse the threshold value line S from the lateral non-overturning region on the side nearer to the origin to the lateral overturning region on the side farther from the origin, it is determined that there is a possibility of lateral overturning of the vehicle.

The hysteresis line H1 corresponds to a case where only the rolling angle θ has been slowly increased with the rolling angular speed ω remaining maintained substantially at 0 (zero) from a state in which both of the rolling angle θ and the rolling angular speed ω have been 0 (i.e., from the origin). When the rolling angle θ has reached a critical rolling angle θCRT at a point a which is an intercept at which the threshold value line S intersects the axis of ordinates, it is determined that there is a possibility of lateral overturning of the vehicle. At this time, the position CG of the gravity of center of the vehicle is on a vertical line extending through a tire which is an outer tire in a rolling direction and which is a fulcrum of rolling. This state is a limitation of static stability regarding the lateral overturning of the vehicle. The value of the critical rolling angle θCRT is varied depending on the shape and the loaded state of the vehicle, but is generally on the order of 50°.

Even if the rolling angle θ is 0, if a large rolling angular speed ω is applied, there is a possibility that the vehicle is overturned laterally. The rolling angular speed ω at this time is defined as a critical rolling angular speed ωCRT.

When the vehicle has a rolling angular speed ω in the same direction as the direction of the rolling angle θ, the lateral overturning is promoted by this rolling angular speed ω. Therefore, even if the vehicle is in a state in which the rolling angle θ is smaller than the critical rolling angle θCRT, the lateral overturning may occur. For example, when the hysteresis line for the rolling angle θ and the rolling angular speed ω is represented by H2, it is determined that there is a possibility of lateral overturning of the vehicle at a point b traversing the threshold value line S from the side nearer to the origin to the side farther from the origin. The rolling angle θ at this time is a value smaller than the critical rolling angle θCRT.

When the hysteresis line for the rolling angle θ and the rolling angular speed ω is represented by H3, the rolling angular speed ω assuming a positive value is changed quickly from increasing to decreasing and is further decreased to a negative value and hence, the hysteresis line H3 cannot traverse the threshold value line S. Therefore, it is determined that there is not a possibility of lateral overturning of the vehicle.

Figure 3:
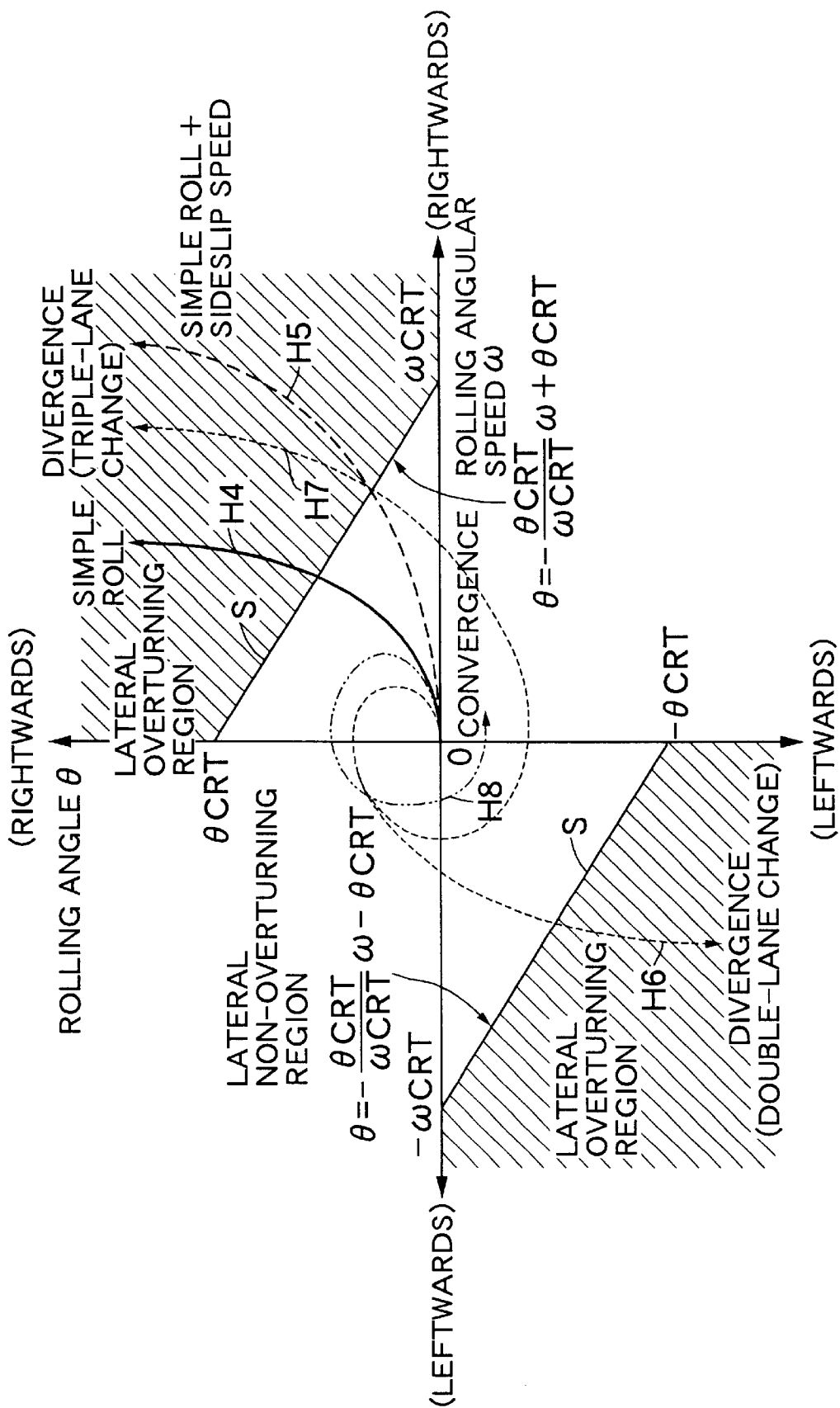

FIG. 3 shows the entire two-dimensional map for determining the possibility of lateral overturning of the vehicle. Two threshold value lines S, S are established in the first quadrant and a third quadrant and are point-symmetric about the origin in an initially set state. The reason why a lateral overturning region is not established in each of a second quadrant where the rolling angle θ is positive and the rolling angular speed ω is negative, and in a fourth quadrant where the rolling angle θ is negative and the rolling angular speed ω is positive, is that the lateral overturning of the vehicle does not occur in a state in which a rolling angular speed ω in a direction opposite to the direction of the rolling angle θ has been generated.

Hysteresis lines H4, H5, H6, H7, and H8 for the rolling angle θ and the rolling angular speed ω corresponding to the various types of the lateral overturning described with reference to FIG. 1 are shown in FIG. 3.

The hysteresis line H4 corresponds to the lateral overturning of the "simple roll" type such as "flip-over", "climb-over", "fall-over" and the like, wherein the absolute value of the rolling angle θ and the absolute value of the rolling angular speed ω are simply increased, resulting in the lateral overturning of the vehicle.

The hysteresis line H5 corresponds to the lateral overturning of the "simple roll+lateral slipping speed" called "trip-over", wherein the rolling angular speed ω is increased sharply, resulting in the lateral overturning, due to the rolling moment generated by the collision of a tire against a curb or the like in the course of lateral slipping of the vehicle.

The hysteresis lines H6 and H7 correspond to the lateral overturning of the "divergence" type called "turn-over". The hysteresis lines H6 indicates the lateral overturning upon the double-lane change. In this case, in the course of the vehicle being rolled rightwards upon the first lane change and being rolled leftwards upon the next lane change, the absolute value of the rolling angle θ is diverged past the threshold value line S in the third quadrant, resulting in the lateral overturning. The hysteresis line H7 indicates the lateral overturning upon the triple-lane change. In this case, in the course of the vehicle being rolled rightwards upon the first lane change, being rolled leftwards upon the next lane change and rolled again rightwards upon the subsequent lane change, the absolute value of the rolling angle θ is diverged past the threshold value line S in the first quadrant, resulting in the lateral overturning.

In the hysteresis line H8, the rolling angle θ is converged toward the origin before passing the threshold value line S, and in this case, the vehicle cannot be overturned laterally or sideways.

Figure 4:
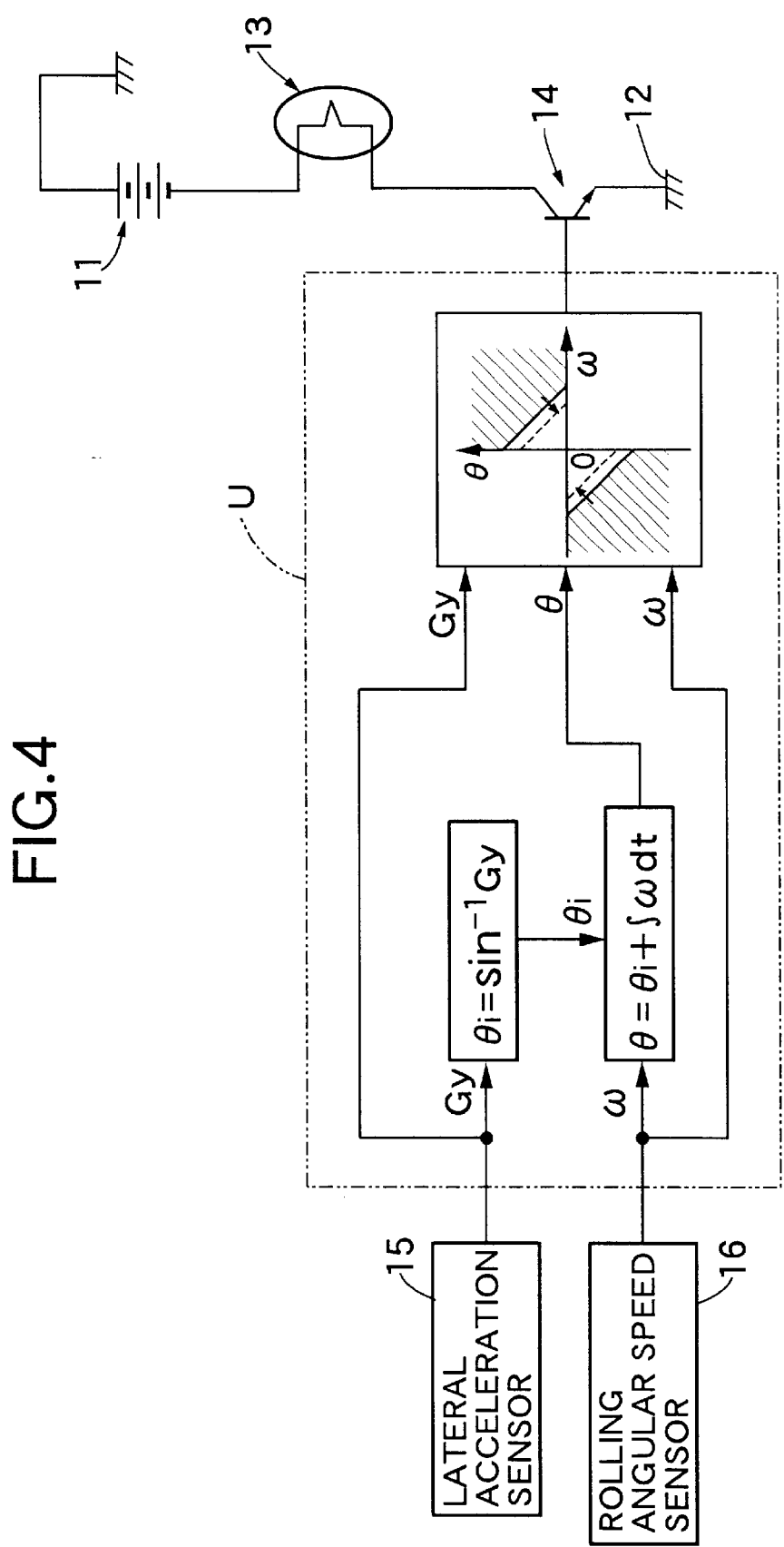

FIG. 4 shows one example of a control system for deploying an air curtain for restraining the head of an occupant along an inner surface of a vehicle compartment upon the lateral overturning of the vehicle.

An inflator 13 for generating a high-pressure gas for deploying the air curtain and an ignition transistor 14 are connected in series between a battery 11 and a ground site 12. When the ignition transistor 14 is turned on by a command from an electronic control unit U, the inflator 13 is ignited to generate the high-pressure gas, and the air curtain supplied with the high-pressure gas is deployed along the inner surface of the vehicle compartment. To determining whether there is a possibility of lateral overturning of the vehicle, a signal from a lateral acceleration sensor 15 for detecting a lateral acceleration Gy, which is an acceleration in a lateral direction of the vehicle body, and a signal from a rolling angular speed sensor 16 for detecting a rolling angular speed ω of the vehicle are input to the electronic control unit U.

Figure 5:
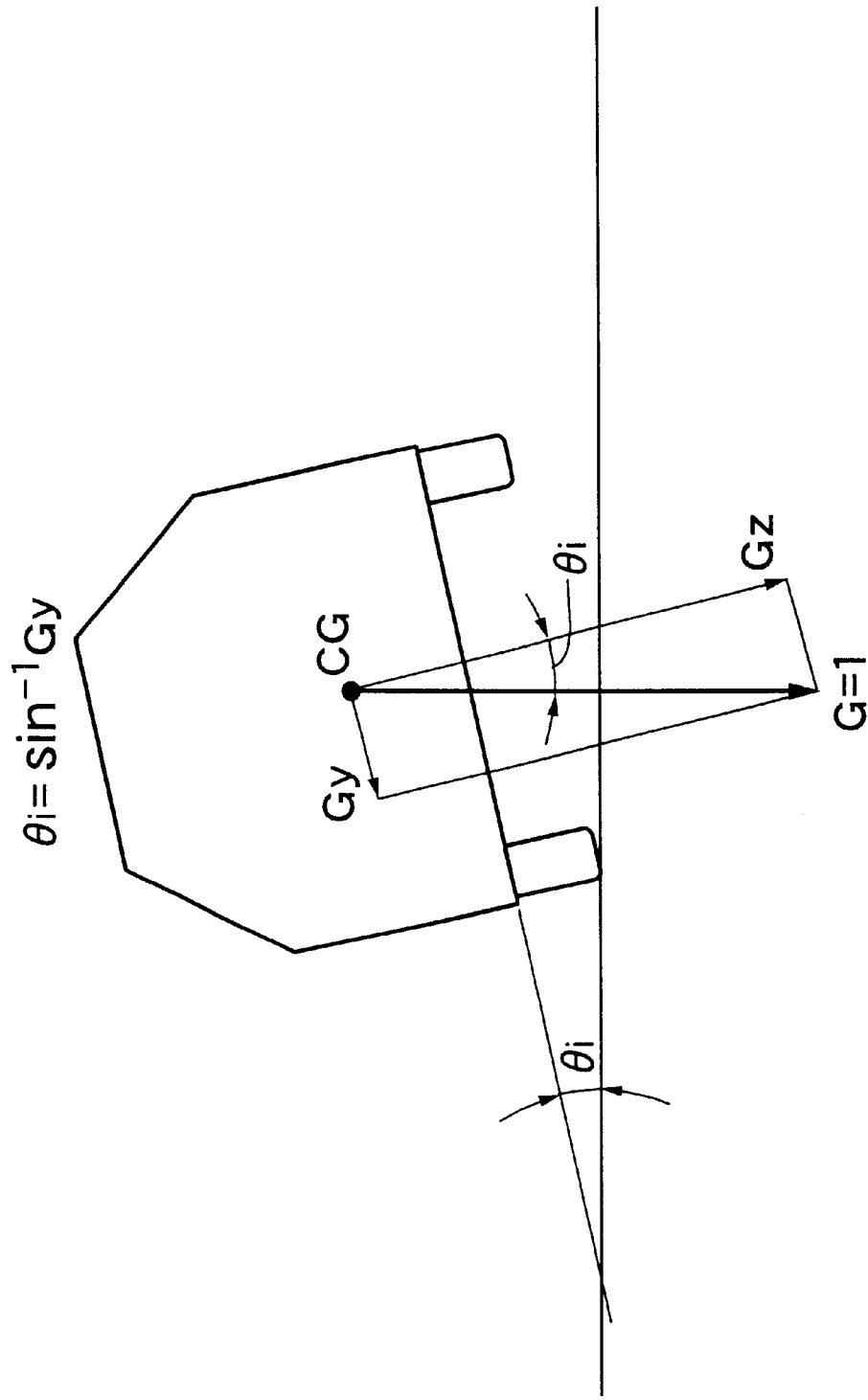

As shown in FIGS. 4 and 5, the lateral acceleration sensor 15 fixed to the vehicle body outputs a lateral acceleration Gy signal at a time point of turning-on of an ignition switch. When the ignition switch has been turned on, the vehicle is in its stopped state and hence, a lateral acceleration due to a centrifugal force produced with the turning movement of the vehicle cannot be detected, and only a component of a gravitational acceleration G (=1) in the lateral direction of the vehicle body is detected as a lateral acceleration Gy. Therefore, an initial value θi of rolling angle θ of the vehicle can be calculated using the lateral acceleration Gy according to an equation, $\theta i = \sin^{-1} Gy$.

When the initial value θi of the rolling angle θ of the vehicle has been calculated based on an output from the lateral acceleration sensor 15 at the time point of turning-on of the ignition switch in the above manner, a rolling angle θ of the vehicle is calculated by adding a value of variation in rolling angle θ to the initial value θi. More specifically, the rolling angle θ of the vehicle is calculated by adding an integration value ∫ωdt of a rolling angular seed ω output by the rolling angular speed sensor 16 from the time point turning-on of the ignition switch as a value of variation in rolling angle θ to the initial value θi.

The lateral acceleration sensor 15 has a demerit associated therewith in that it cannot detect a lateral acceleration Gy during free dropping of the vehicle, and cannot recognize a lateral acceleration due to the centrifugal force generated with the turning movement of the vehicle as a lateral acceleration Gy which is a component in the lateral direction of the vehicle body, thereby mis-detecting it. However, the rolling angle θ can be correctly calculated, with such demerit eliminated, by using the lateral acceleration Gy output by the lateral acceleration sensor 15 only for the calculation of the initial value θi of the rolling angle θ of the vehicle at the time point of turning-on of the ignition switch, and using the integration value ∫ωdt of the rolling angular seed ω output by the rolling angular speed sensor 16 for the calculation of a subsequent rolling angle θ of the vehicle.

Figure 6:
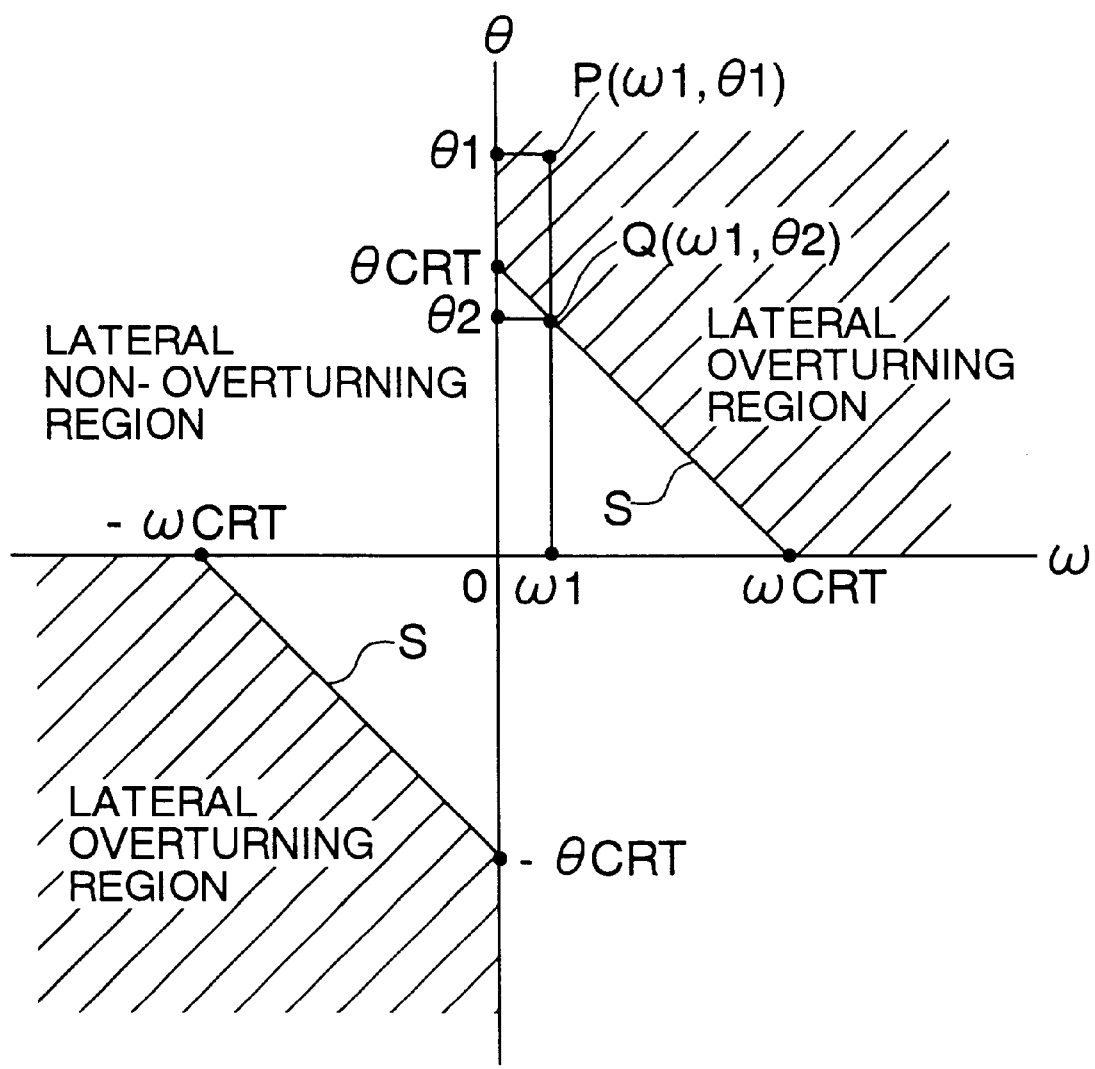

A hysteresis line which is a locus of coordinate points formed by the rolling angle θ of the vehicle calculated in the above manner and the rolling angular speed ω output by the rolling angular speed sensor 16 is described on a map shown in FIG. 6. When the hysteresis line has traversed the threshold value lines S, S from the side nearer to the origin to the side farther from the origin, it is determined that there is a possibility that the vehicle is overturned laterally or sideways, and the ignition transistor 14 is turned on to ignite the inflator 13 for the air curtain.

The above-described operation will be further described with reference to FIGS. 6 and 7.

First, a lateral acceleration Gy and a rolling angular speed ω are read at Step S1, and threshold value lines S, S on the map are determined in accordance with the lateral acceleration Gy at Step S2. The threshold value lines S, S are determined, if a critical rolling angle θCRT which is an intercept on the axis of ordinates of the map and a critical rolling angular speed ωCRT which is an intercept on the axis of abscissas, are determined. In the present embodiment, when the lateral overturning of the vehicle is promoted due to the lateral acceleration Gy, both of the critical rolling angle θCRT and the critical rolling angular speed ωCRT are decreased, whereby the threshold value lines S, S are moved in the direction toward the origin. When the lateral overturning of the vehicle is suppressed by the lateral acceleration Gy, both of the critical rolling angle θCRT and the critical rolling angular speed ωCRT are increased, whereby the threshold value lines S, S are moved in the direction away from the origin. Thus, it is possible to determine a suitable lateral overturning region and a suitable lateral non-overturning region according to the lateral acceleration Gy of the vehicle.

When the threshold value line S in the first quadrant is moved in the direction away from the origin, the threshold value line S in the third quadrant is moved in the direction toward the origin, and when the threshold value line S in the first quadrant is moved in the direction toward the origin, the threshold value line S in the third quadrant is moved in the direction away from the origin.

If the critical rolling angle θCRT and the critical rolling angular speed ωCRT are determined, an equation for the threshold value lines S, S is given (see FIG. 3) as follows:

$$\theta = -(\theta CRT/\omega CRT)\omega \pm \theta CRT$$

Subsequently, it is determined whether a coordinate point P provided by a current rolling angle θ1 and a current rolling angular speed ω1 is in the lateral overturning region or the lateral non-overturning region. More specifically, at Step S3, a current value of rolling angular speed ω1 is substituted for ω in the equation for the threshold value line S to calculate a determination value θ2. The determination value θ2 is a θ coordinate point which is a point Q of intersection between a straight line ω=ω1 and the threshold value line S. At subsequent Step S4, the determination value θ2 is compared with the current rolling angle θ1. If a relation, |θ2|<|θ1| is established, it is determined at Step S5 that the coordinate point P provided by the current rolling angle θ1 and the current rolling angular speed ω1 is in the lateral overturning region. If the relation, |θ2|<|θ1| is not established, it is determined at Step S5 that the coordinate point P provided by the current rolling angle θ1 and the current rolling angular speed ω1 is in the lateral non-overturning region. A case ($|\theta2|<|\theta1|$) where the coordinate point P is in the lateral overturning region is shown in FIG. 6.

In making a sudden double-lane change or the like for the vehicle, when the rolling angle of the vehicle reaches a fully bumping angle (which is a rolling angle at which a suspension spring for one of left and right wheels is contracted to a limit and a suspension spring for the other wheel is expanded to a limit, and which is generally on the order of 8°±2°), a sudden lateral overturning due to a rolling resonance may occur in some cases.

Figure 9:
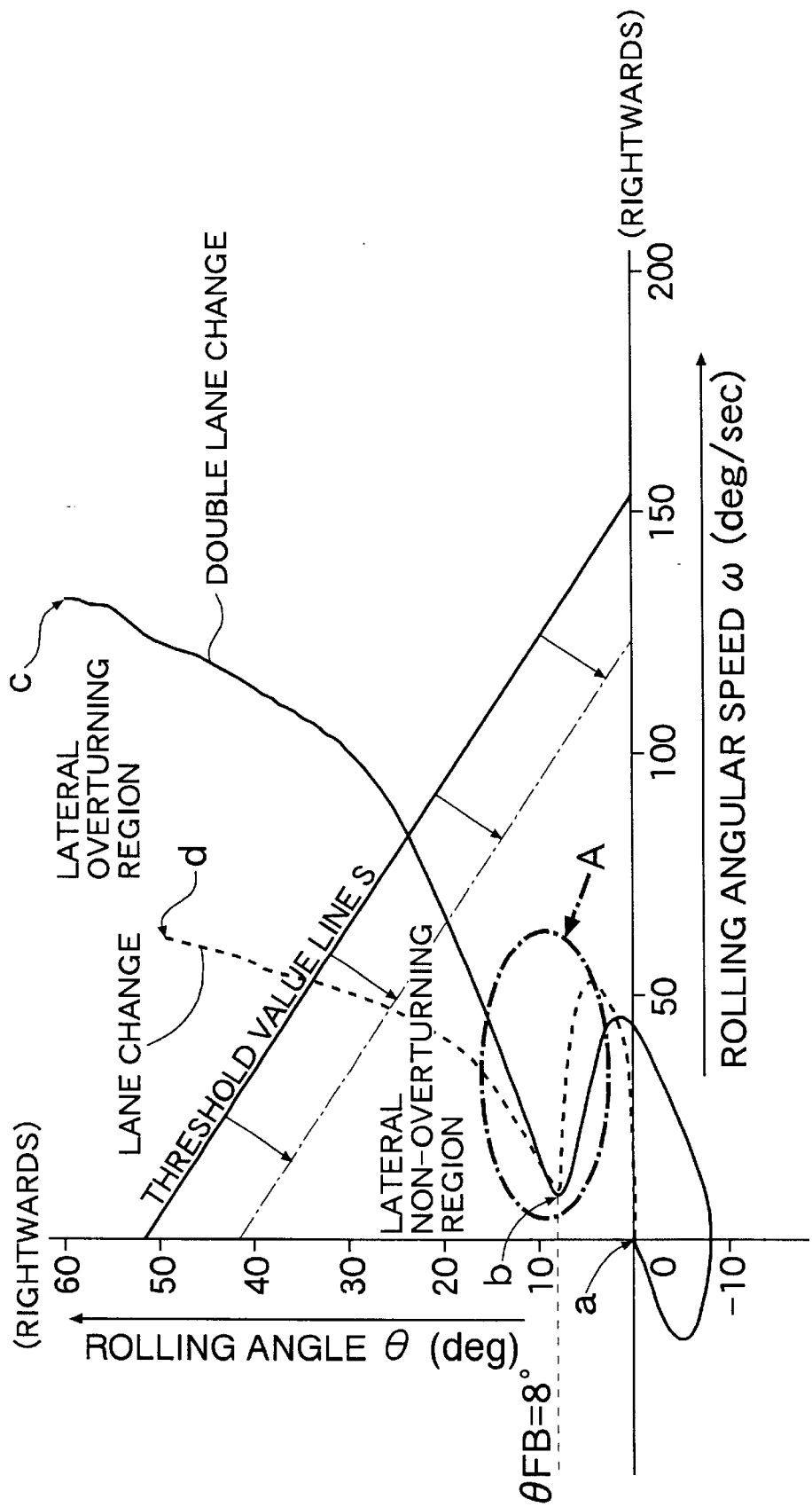

A solid line in FIG. 9 indicates such a hysteresis line that the vehicle is overturned laterally or sideways due to the rolling resonance, when the double-lane change has been made.

Figure 8:
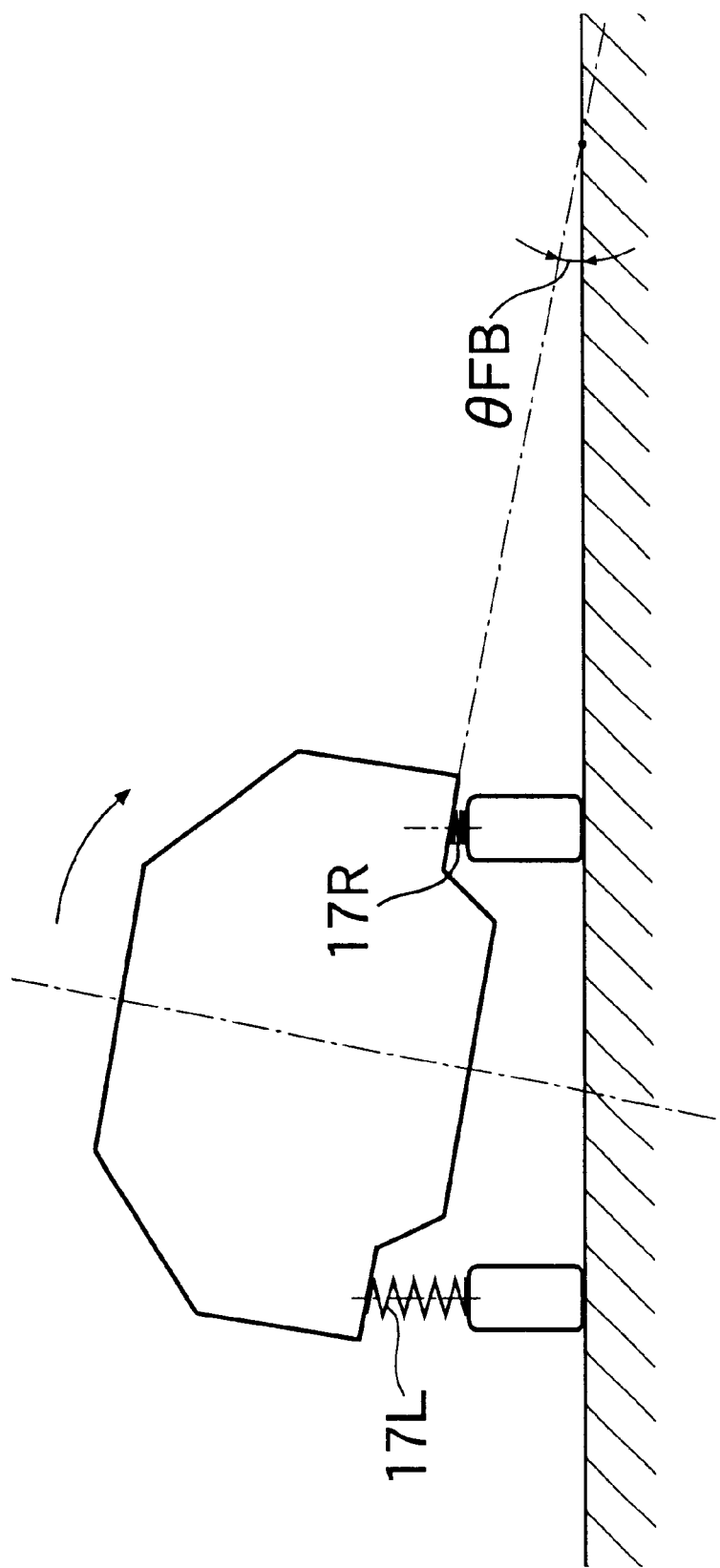

First, when the steering wheel is turned leftwards in order to conduct a lane change leftwards from a point a (an origin) on a map, the vehicle body is turned leftwards, while being rolled leftwards, and is thus moved onto a left lane. When the steering wheel is then turned rightwards in order to restore the vehicle from the left lane onto a right lane, the vehicle rolled leftwards up to that time is rolled rightwards, whereby the rightward rolling angle θ approaches a fully bumping angle θFB, while the rightward rolling angular speed ω is being gradually decreased. When the rightward rolling angle θ has reached the fully bumping angle θFB (see a point b), and the suspension spring 17R on the right of the vehicle body is contracted completely, while the suspension spring 17L on the left of the vehicle body is expanded completely, as shown in FIG. 8, a buffering effect for a rolling moment provided by the resilience of the suspension springs 17L and 17R is lost. Therefore, the rightward rolling angular speed ω is increased sharply to toward a point c, and passes the threshold line S in such increasing course, and thus, the vehicle results in the lateral overturning.

A broken line in FIG. 9 indicates such a hysteresis line that the vehicle is overturned laterally or sideways due to the rolling resonance, when the simple double-lane change has been made.

When the steering wheel is turned rightwards in order to conduct a lane change rightwards from the point a (origin) on the map, the rightward rolling angle θ is increased monotonously, and the rightward rolling angular speed ω is once increased and then decreased, and the right rolling angle θ soon reaches the fully bumping rolling angle θFB (see the point b). As a result, as in the case of the above-described double lane change, the buffering effect of rolling moment provided by the resilience of the suspension springs 17L and 17R is lost. Therefore, the rightward rolling angular speed ω is increased sharply to toward a point d and thus, the vehicle results in the lateral overturning.

The hysteresis line indicating the occurrence of such lateral overturning due to the rolling resonance has a feature shown in a region A surrounded by an ellipse in FIG. 9, i.e., such a feature that after the rolling angle θ reaches the fully bumping rolling angle θFB, while the rolling angular speed ω is decreased, the rolling angular speed ω is increased sharply. Therefore, when a hysteresis line having such a feature has been detected, it is determined that there is a high possibility that the lateral overturning due to the rolling resonance occurs within a short time, and hence, the threshold value line S is moved in the direction toward the origin, as shown in FIG. 9. Thus, the air curtain can be deployed prior to the lateral overturning of the vehicle to reliably restrain an occupant.

Figure 10:
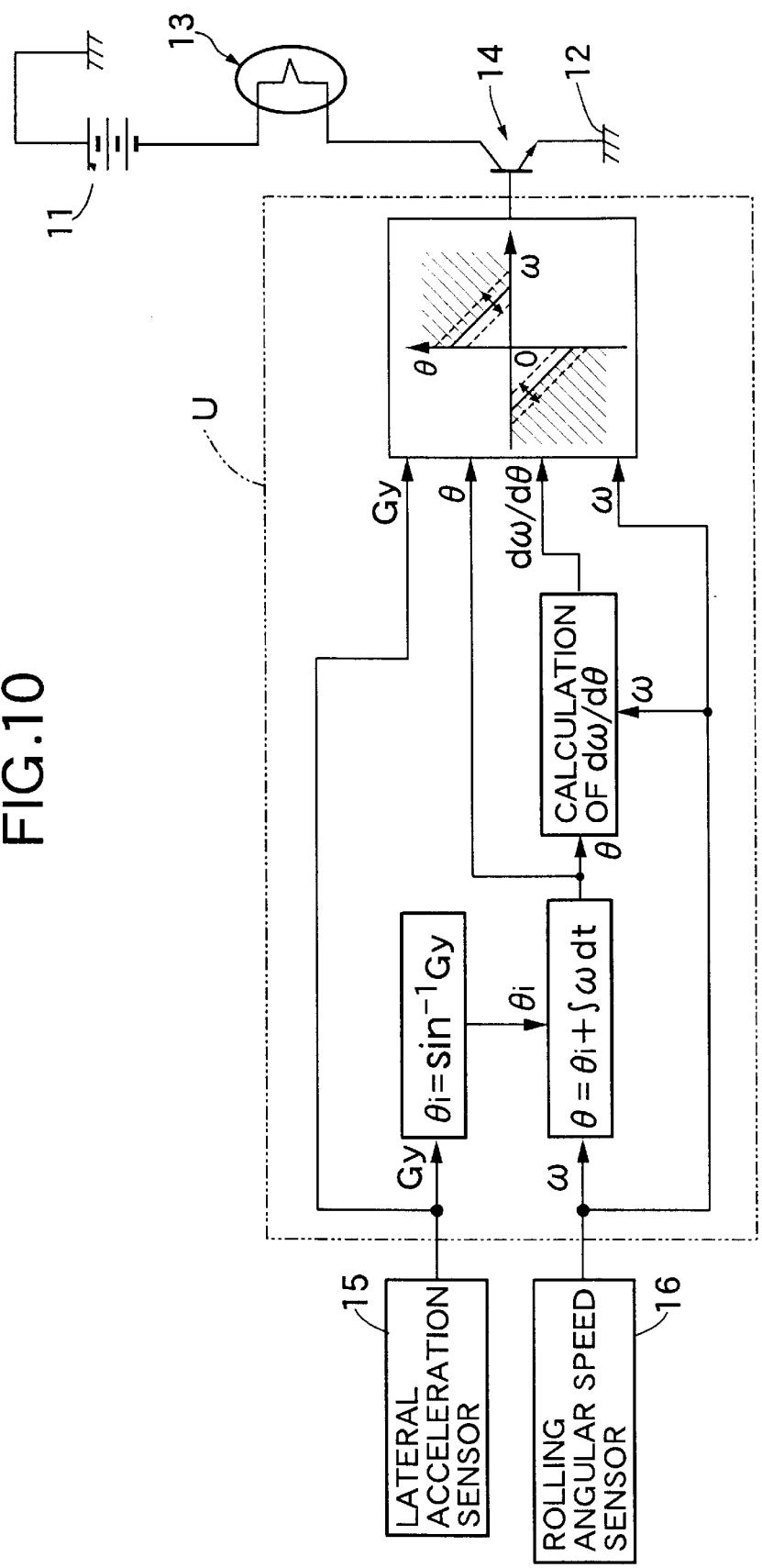

A second embodiment of the present invention will now be described with reference to FIGS. 10 to 12.

FIGS. 11A to 11D show the course of occurrence of the lateral overturning of a "trip-over" type by stages. For example, when the vehicle side slips rightwards (see FIG. 11A), whereby a right tire collides against an obstacle such as curb, the sideslip speed is decreased sharply. Therefore, an inertial force intended to move an occupant toward a right door is applied (see FIG. 11B), and at the same time, a clockwise rolling moment is generated about the tire colliding against the curb on a road, and an intensive rolling angular speed ω overturning the vehicle rightwards is generated (see FIG. 11C). After the vehicle has climbed over the curb, the rightward rolling angle θ is gradually increased, and the vehicle soon results in the lateral overturning (see FIG. 11D).

Figure 12:
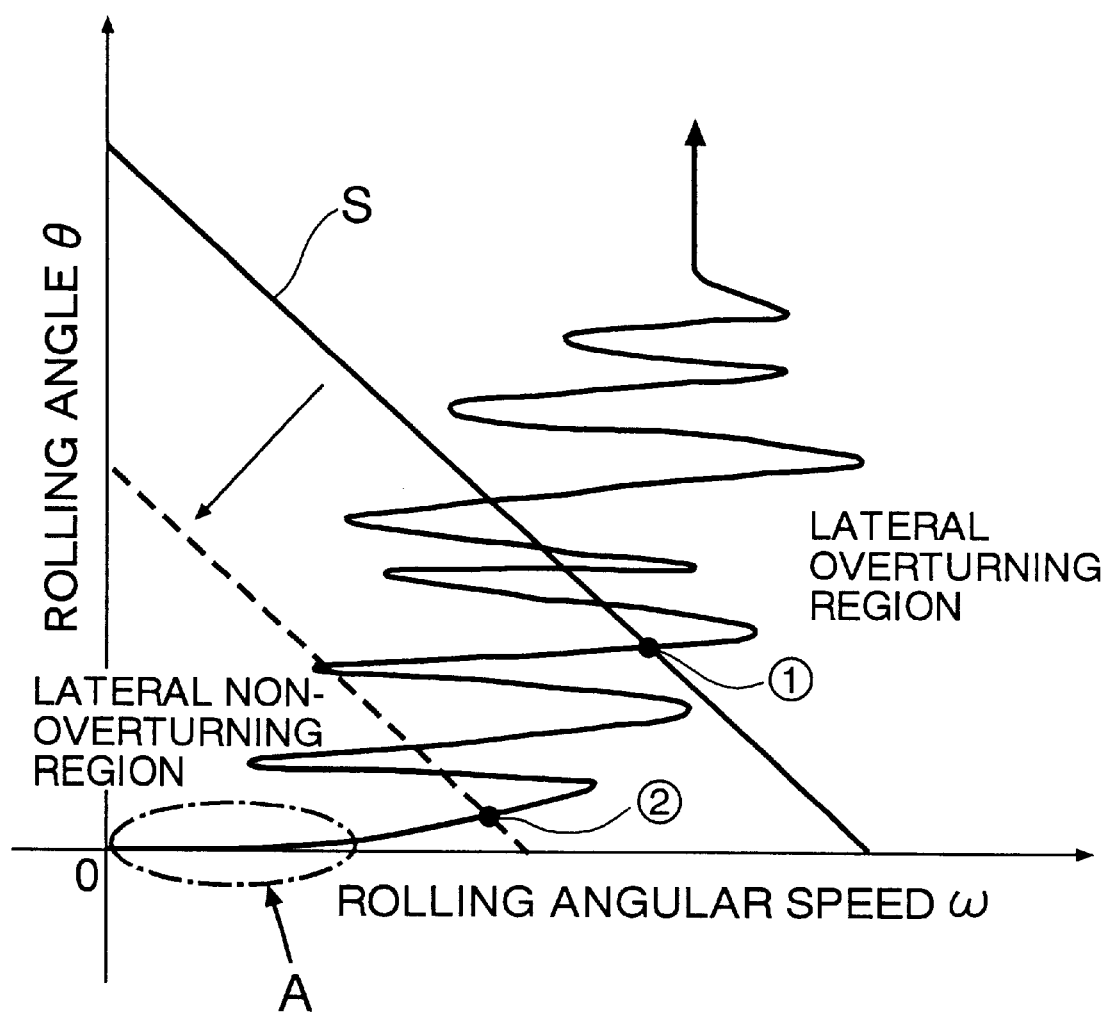

FIG. 12 shows an actual hysteresis line for the rolling angle θ and the rolling angular speed ω in the lateral overturning of the "trip-over" type. This hysteresis line has a feature that the absolute value of a differentiation value dω/dθ of the rolling angular speed ω with regard to the rolling angle θ assumes an extremely large value, and the rolling angle θ is gradually increased, while the positive and negative signs of the differentiation value dω/dθ are being repeatedly reversed. Particularly, immediately after collision of the tire shown in FIG. 11B against an obstacle such as a curb on a road, the differentiation value dω/dθ of the rolling angular speed ω with regard to the rolling angle θ assumes an extremely large value (see an area indicated by A in FIG. 12). Therefore, it is possible, on the basis of this fact, to presume that the possibility of occurrence of the lateral overturning of the "trip-over" type is high.

Even if a differentiation value dω/dt (a time-differentiation value of the rolling angular speed ω) is employed as a parameter for determining the lateral overturning of the "trip-over" type, in place of the above-described differentiation value dω/dθ, a similar function and effect can be provided.

When it is determined in the above manner that the possibility of occurrence of the lateral overturning of the "trip-over" type is high, the determination of the presence of the possibility of the lateral overturning, which is originally carried out at a point ①, can be carried out at a point ② earlier than the point ① because the threshold value line S is moved in the direction toward the origin. Thus, before an occupant is moved toward a right door by inertia, the air curtain can be deployed promptly, and the interference of the air curtain and the occupant with each other can be avoided.

A third embodiment of the present invention will now be described with reference to FIGS. 13 to 16.

Figure 13:
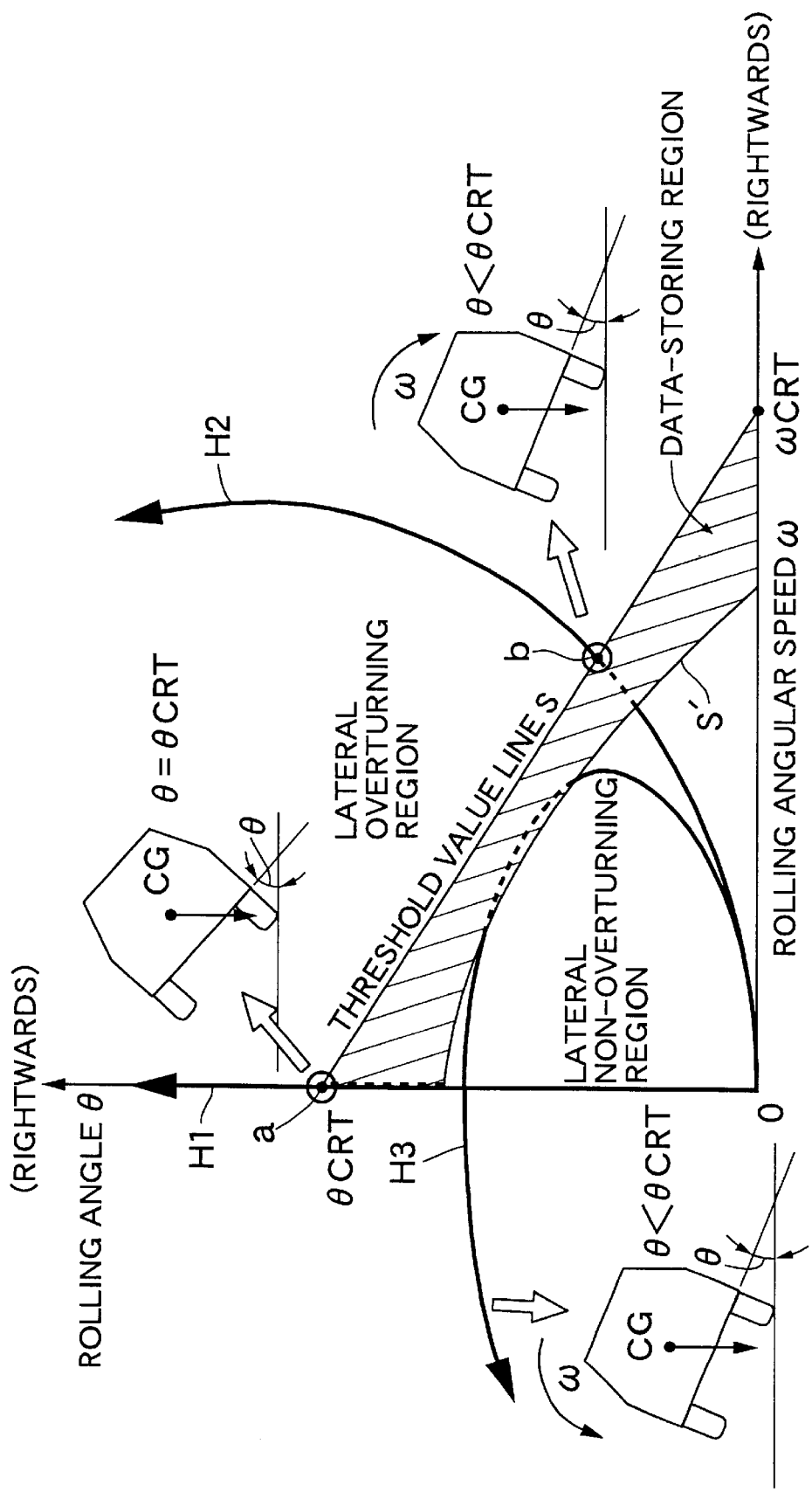
Figure 14:
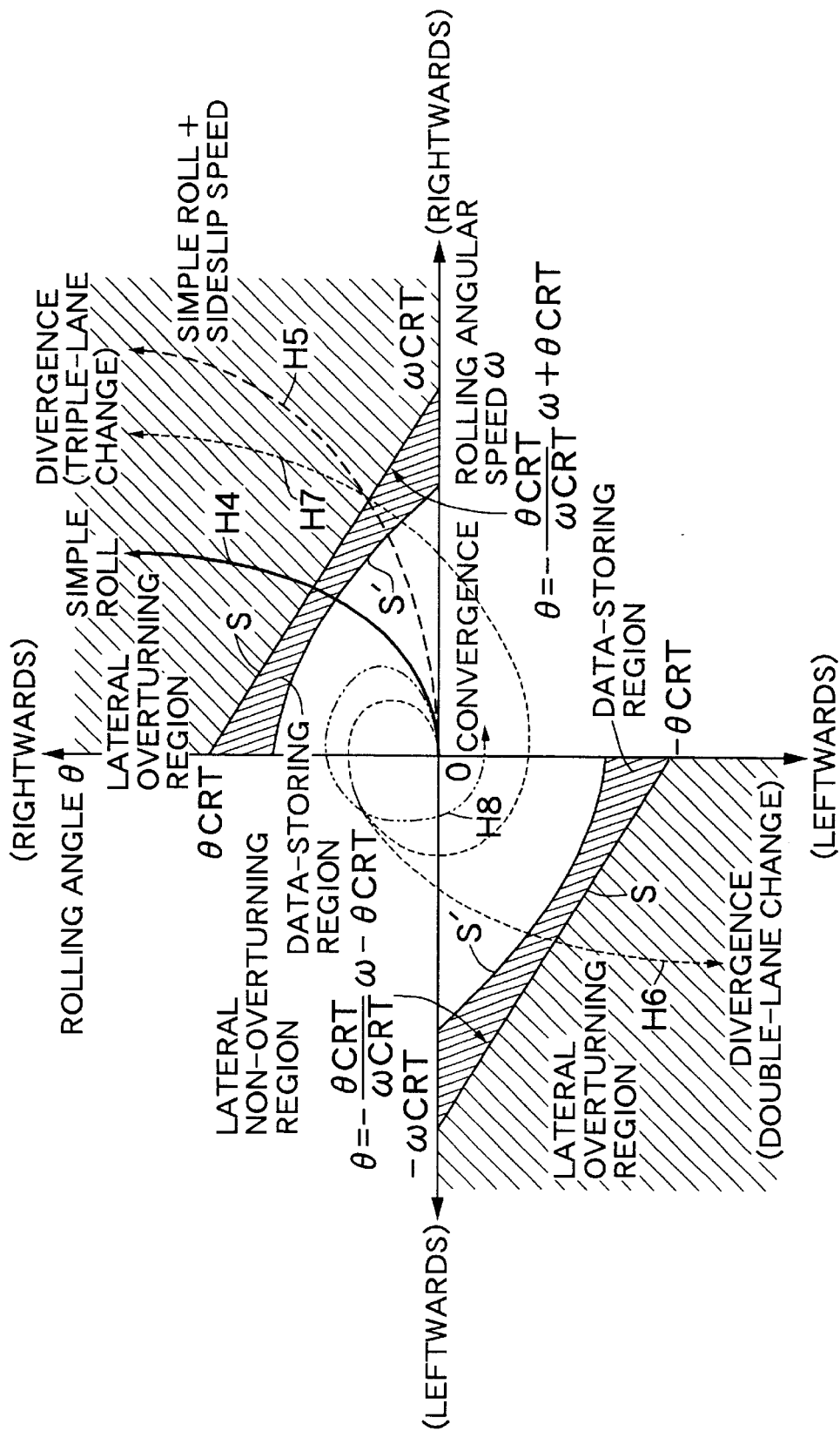
Figure 16:
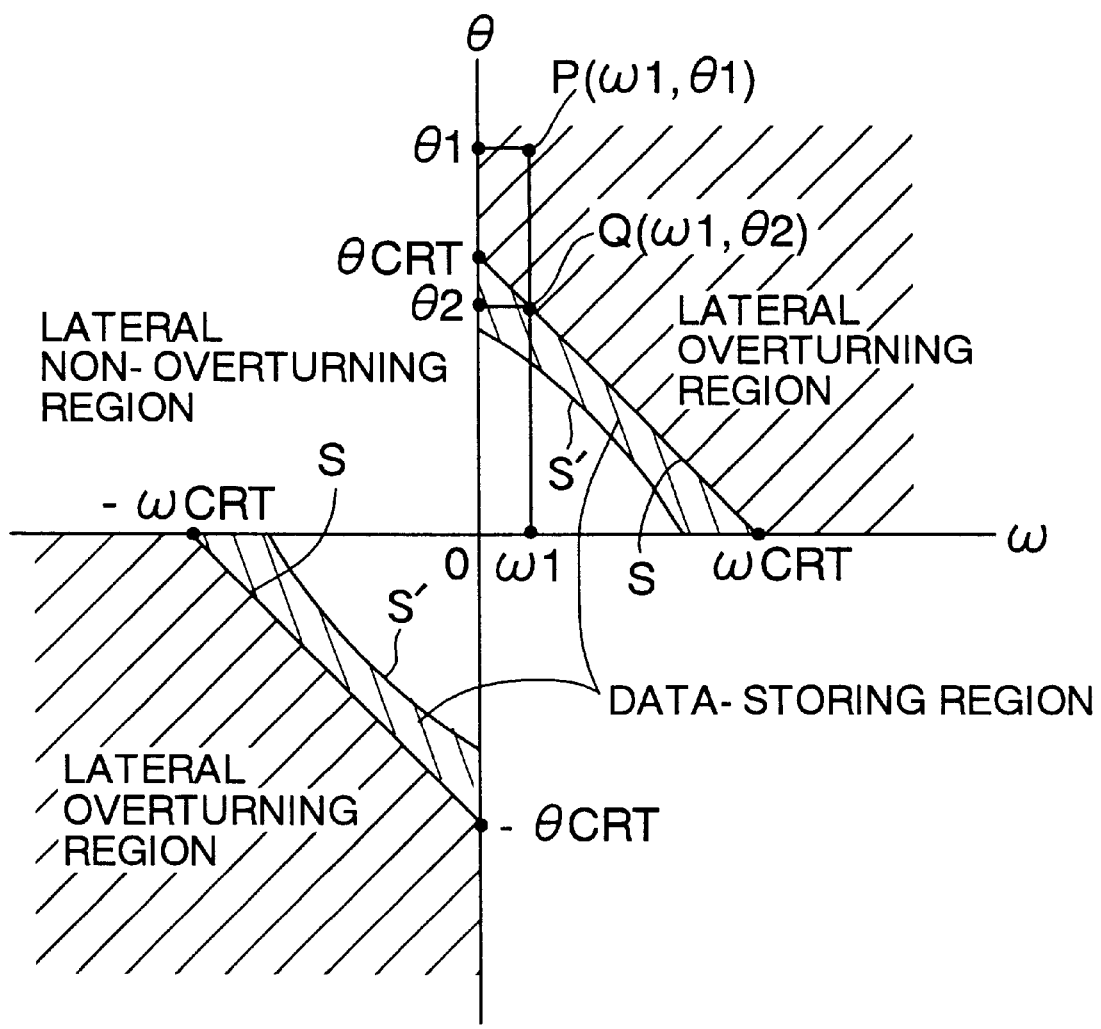

A data-storing region is established within a laterally overturning region on a two-dimensional map, as shown in FIGS. 13, 14 and 16. The data-storing region is established in an elongated shape to adjoin a side of a threshold value line S closer to an origin.

Figure 15:
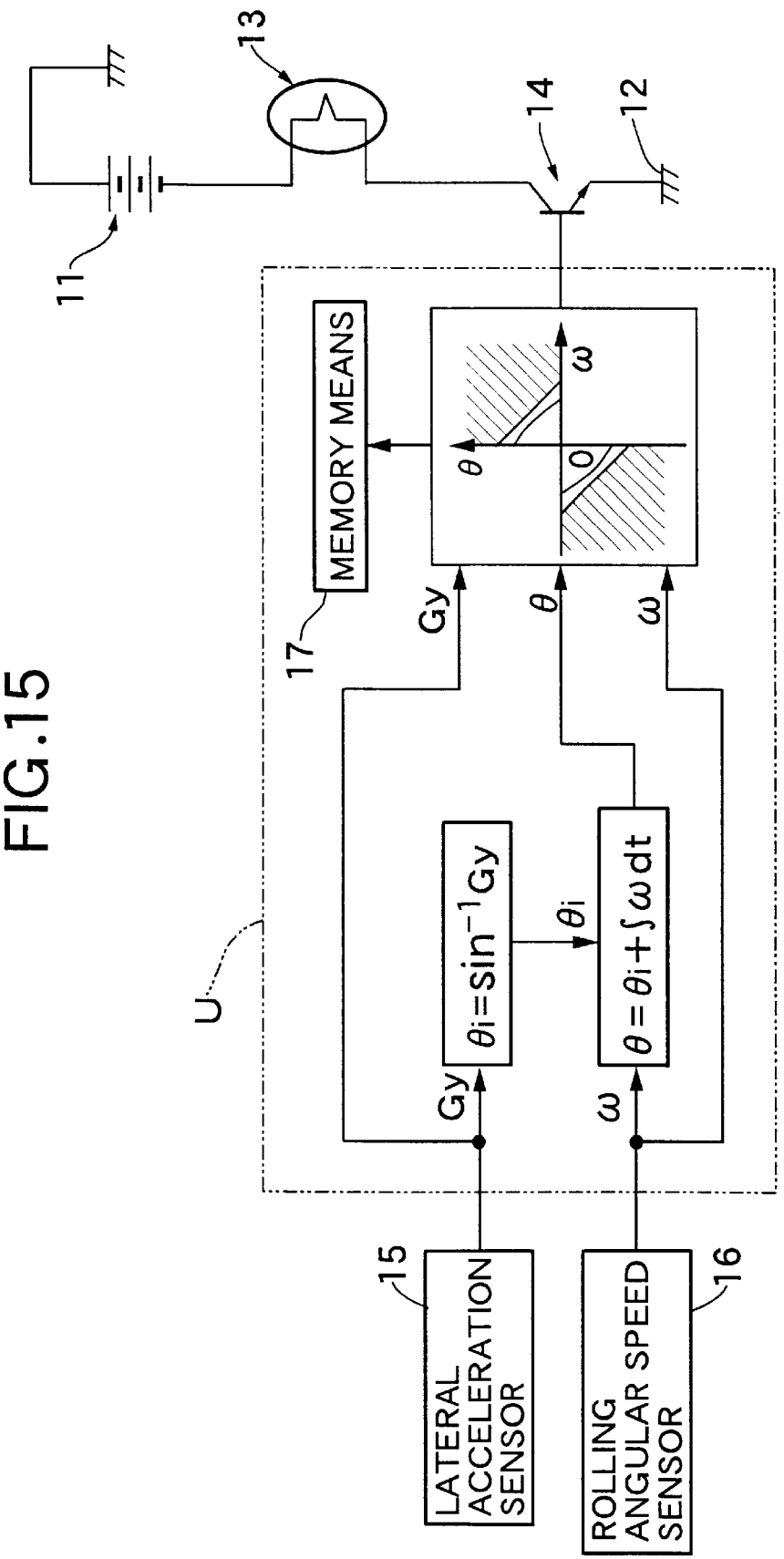

FIG. 15 shows one example of a control system for deploying an air curtain for protecting the head of an occupant along an inner surface of a vehicle compartment upon lateral overturning of a vehicle.

An inflator 13 for generating a high-pressure gas for deploying an air curtain and an ignition transistor 14 are connected in series between a battery 11 and a ground site 12. When the ignition transistor 14 is turned on by a command from an electronic control unit U, the inflator 13 is ignited to generate the high-pressure gas, and the air curtain supplied with the high-pressure gas is deployed along the inner surface of the vehicle compartment. For determining whether there is a possibility of lateral overturning of the vehicle, a signal from a lateral acceleration sensor 15 for detecting a lateral acceleration Gy which is an acceleration in a lateral direction of a vehicle body and a signal from a rolling angular speed sensor 16 for detecting a rolling angular speed ω of the vehicle are input to the electronic control unit U. A memory means 17 is provided in the electronic control unit U for storing a hysteresis line entering into the data-storing region, or a hysteresis line traversing the data-storing region. When the hysteresis line is stored in the memory means 17, a lateral acceleration Gy at that time may be stored simultaneously.

As in the first and second embodiments, when the threshold value line S in a first quadrant is moved in a direction away from the origin, the threshold value line S in a third quadrant is moved in a direction toward the origin. When the threshold value line S in the first quadrant is moved in the direction toward the origin, the threshold value line S in the third quadrant is moved in the direction away from the origin. When the threshold value lines S, S between the lateral overturning region and the lateral non-overturning region are moved in accordance with the lateral acceleration Gy, the data-restoring region is also moved to follow the movement of the threshold value lines S, S.

By representing an equation for threshold value lines S', S' on the side of the data-storing region adjacent the origin by a function of the rolling angle θ and the rolling angular speed ω, it is possible to determine whether the hysteresis line has entered into the data-storing region. A state, in which the hysteresis lines H1, H2 and H3 have entered into or traversed the data-storing region, is shown by a broken line in FIG. 13. When this state is reached, a section of the hysteresis line indicated by this broken line is stored in the memory means 17 of the electronic control unit U. For example, the hysteresis lines H1 and H2 correspond to a case where they traversed the data-storing region, and the vehicle has reached the condition of lateral overturning. The hysteresis line H3 corresponds to a case where it has only entered into the data-storing region, and the vehicle has not reached the condition of lateral overturning.

As described above, the rolling angle θ and the rolling angular speed ω on the hysteresis line in the data-storing region are stored. Therefore, it is possible to confirm whether a driver is safely driving and to what degree by reading such stored rolling angle θ and rolling angular speed ω to investigate them. If an inappropriate driving is being conducted by the driver, the driver can be pressed to drive safely. Even when the vehicle has reached the lateral overturning, it is possible to easily verify later how the vehicle has reached such condition by reading the stored hysteresis line to review it.

Although the embodiments of the present invention have been described in detail, it will be understood that the present invention is not limited to the above-described embodiments, and various modifications in design may be made without departing from the spirit and scope of the invention defined in the appended claims.

For example, the determination of the presence or absence of the possibility of the lateral overturning of the vehicle is suitable to the control of the deployment of the air curtain in the embodiments, but can be utilized to another application such as the control of the deployment of a side air bag or the control of the deployment of a housed roll bar. The initial value θi of the rolling angle θ of the vehicle can be calculated according to an equation, $\theta i = \cos^{-1} Gz$, using a vertical acceleration Gz which is a component of a gravitational acceleration G in a vertical direction of the vehicle body.

Further, the storage area used according to the third embodiment of the invention could be combined with first and second embodiments of the invention.

What is claimed is:

1. A process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses said threshold value line from the lateral non-overturning region to the lateral overturning region, it is determined that there is a possibility of lateral overturning of the vehicle, and wherein when the rolling angular speed is increased after the rolling angle has reached a fully-bumping rolling angle while the rolling angular speed was decreased, said threshold value line is moved toward the origin.

2. A process for determining the lateral overturning of a vehicle according to claim 1, further including the steps of:
establishing a data-storing region adjacent said threshold value line in the lateral non-overturning region, and when said hysteresis line has entered into said data-storing region, said hysteresis line is stored.

3. A process for determining the lateral overturning of a vehicle according to claim 2, wherein when said hysteresis line has entered into said data-storing region, a portion of said hysteresis line in said data storage region is stored.

4. A process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses said threshold value line from the lateral non-overturning region to the lateral overturning region, it is determined that there is a possibility of lateral overturning of the vehicle, wherein a data-storing region adjacent the threshold value line is established in the lateral non-overturning region, and when said hysteresis line has entered into said data-storing region, said hysteresis line is stored.

5. A process for determining the lateral overturning of a vehicle according to claim 4, wherein when said hysteresis line has entered into said data-storing region, a portion of said hysteresis line in said data storage region is stored.

6. A process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses said threshold value line from the lateral non-overturning region to the lateral overturning region, it is determined that there is a possibility of lateral overturning of the vehicle, and wherein said threshold value line is moved in accordance with at least one of a differentiation value of the rolling angular speed with regard to the rolling angle and a time-differentiation value of the rolling angular speed.

7. A process for determining the lateral overturning of a vehicle according to claim 6, wherein said threshold value line is moved in accordance with the time-differentiation value of the rolling angular speed.

8. A process for determining the lateral overturning of a vehicle according to claim 6, wherein said threshold value line is moved in accordance with the differentiation value of the rolling angular speed with regard to the rolling angle.

9. A process for determining the lateral overturning of a vehicle according to claim 6, further including the steps of:

establishing a data-storing region adjacent said threshold value line in the lateral non-overturning region, and when said hysteresis line has entered into said data-storing region, said hysteresis line is stored.

10. A process for determining the lateral overturning of a vehicle according to claim 9, wherein when said hysteresis line has entered into said data-storing region, a portion of said hysteresis line in said data storage region is stored.

11. A process for determining the lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle as parameters, so that when a hysteresis line for actual rolling angles and actual rolling angular speeds of the vehicle traverses said threshold value line from the lateral non-overturning region to the lateral overturning region, it is determined that there is a possibility of a lateral overturning of the vehicle, and wherein when it is determined that the vehicle is in a condition such that said lateral overturning of the vehicle is very likely to occur, said threshold value line is moved toward the origin.

12. A process for determining the lateral overturning of a vehicle according to claim 11, wherein it is determined that the vehicle is in a condition where said lateral overturning of the vehicle is very likely to occur when the rolling angular speed is increased after the rolling angle has reached a fully-bumping rolling angle while the rolling angular speed was decreased.

13. A process for determining the lateral overturning of a vehicle according to claim 11, wherein it is determined that the vehicle is in a condition where said lateral overturning of the vehicle is very likely to occur when a differentiation value of the rolling angular speed with regard to the rolling angle exceeds a predetermined large value.

14. A process for determining the lateral overturning of a vehicle according to claim 11, wherein it is determined that the vehicle is in a condition where said lateral overturning of the vehicle is very likely to occur when a time-differentiation value of the rolling angular speed exceeds a predetermined large value.

15. A process for determining the lateral overturning of a vehicle according to claim 11, further including the steps of:

establishing a data-storing region adjacent said threshold value line in the lateral non-overturning region, and when said hysteresis line has entered into said data-storing region, said hysteresis line is stored.

16. A process for determining the lateral overturning of a vehicle according to claim 15, wherein when said hysteresis line has entered into said data-storing region, a portion of said hysteresis line in said data storage region is stored.

* * * * *

UNITED STATES PATENT AND TRADEMARK OFFICE
CERTIFICATE OF CORRECTION

Figure 7:
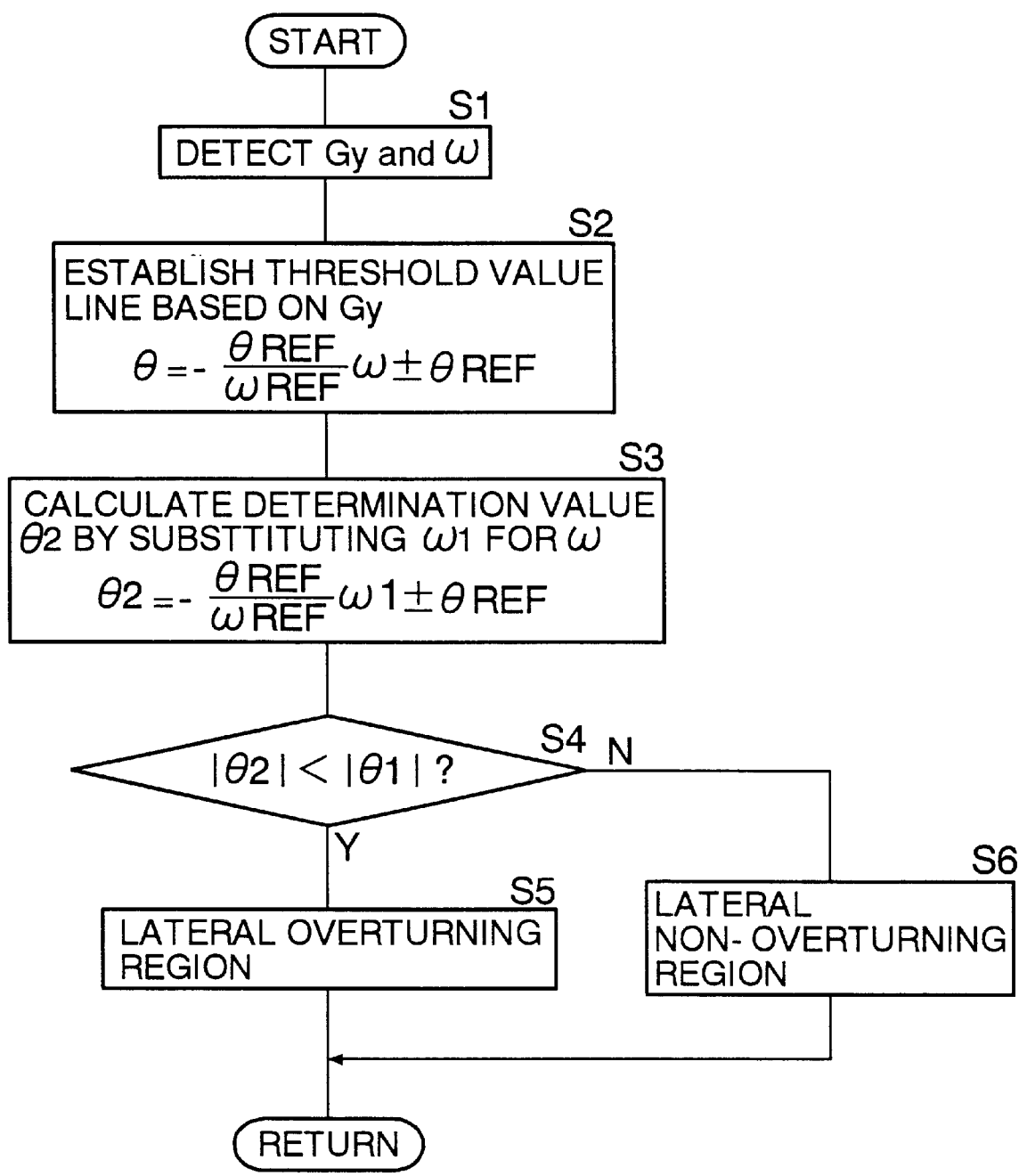

PATENT NO.   : 6,611,784 B2
DATED        : August 26, 2003
INVENTOR(S)  : Shigeo Tobaru, Hiroyuki Maeda and Osamu Takahata It is certified that error appears in the above-identified patent and that said Letters Patent is hereby corrected as shown below:

Drawings,
FIG. 7, box S3, change "θ2 BY SUBSTTITUTING ω 1 for ω" to
-- θ2 BY SUBSTITUTING ω 1 FOR ω --.

Column 5,
Line 7, change "the "simple roll" type further sub-classified into "flip-over"," to
-- the "simple roll" type is further sub-classified into "flip-over", --.
Line 10, change ""trip-over, and the lateral overturning of the "divergence" is" to
-- "trip-over", and the lateral overturning of the "divergence" is --.
Line 12, change "The "flip-over" is a lateral overturning" resulting from" to
-- The "flip-over" is a lateral overturning resulting from --.
Line 38, change "speed ω on axis of abscissas corresponds to the rightward" to
-- speed ω on the axis the abscissas corresponds to the rightward --.
Line 64, change "of the vehicle. At this time, the position CG of the gravity of" to
-- of the vehicle. At this time, the position CG of the center of --.
Line 65, change "center of the vehicle is on a vertical line extending through" to
-- gravity of the vehicle is on a vertical line extending through --.

Column 6,
Line 62, change "hysteresis lines H6 indicates the lateral overturning upon the" to
-- hysteresis line H6 indicates the lateral overturning upon the --.
Column 7,
Line 25, change "determining whether there is a possibility of lateral over-" to
-- determine whether there is a possibility of lateral over- --.
Line 52, change "integration value ∫ωdt of a rolling angular seed ω output by" to
-- integration value ∫ωdt of a rolling angular speed ω output by --.

Column 8,
Line 1, change "integration value ∫ωdt of the rolling angular seed ω output " to
-- integration value ∫ωdt of the rolling angular speed ω output --.

UNITED STATES PATENT AND TRADEMARK OFFICE
CERTIFICATE OF CORRECTION

PATENT NO.     : 6,611,784 B2
DATED          : August 26, 2003
INVENTOR(S)    : Shigeo Tobaru, Hiroyuki Maeda and Osamu Takahata It is certified that error appears in the above-identified patent and that said Letters Patent is hereby corrected as shown below:

Column 9,
Line 31, change "angular speed ω is increased sharply to toward a point c, and" to -- angular speed ω is increased sharply toward a point c, and --.
Line 48, change "speed ω is increased sharply to toward a point d and thus, the" to -- speed ω is increased sharply toward a point d and thus, the --.

Signed and Sealed this

Eighth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,611,784 B2
DATED        : August 26, 2003
INVENTOR(S)  : Shigeo Tobaru et al.

It is certified that error appears in the above-identified patent and that said Letters Patent is hereby corrected as shown below:

Column 5,
Line 38, change "speed ω on axis of abscissas corresponds to the rightward" to
-- speed ω on the axis of abscissas corresponds to the rightward --.

Signed and Sealed this

Fourteenth Day of September, 2004

JON W. DUDAS
*Director of the United States Patent and Trademark Office*